(No Model.)

J. C. HAGERTY.
BARK CUTTING MACHINE.

No. 332,796. Patented Dec. 22, 1885.

Witnesses,
Geo. H. Strong
J. S. Nourse

Inventor,
John C. Hagerty
By Dewey & Co.
Attorneys

N. PETERS. Photo-Lithographer, Washington, D. C.

UNITED STATES PATENT OFFICE.

JOHN C. HAGERTY, OF SANTA CRUZ, CALIFORNIA.

BARK-CUTTING MACHINE.

SPECIFICATION forming part of Letters Patent No. 332,796, dated December 22, 1885.

Application filed April 1, 1885. Serial No. 160,944. (No model.)

*To all whom it may concern:*

Be it known that I, JOHN C. HAGERTY, of Santa Cruz, Santa Cruz county, State of California, have invented certain Improvements in Bark-Cutting Machines; and I hereby declare the following to be a full, clear, and exact description of the same.

My invention relates to a machine for cutting bark and preparing it for tanners' use. It consists of certain improvements, which will be more fully specified, and specifically set forth in the claims hereinafter.

Figure 1:
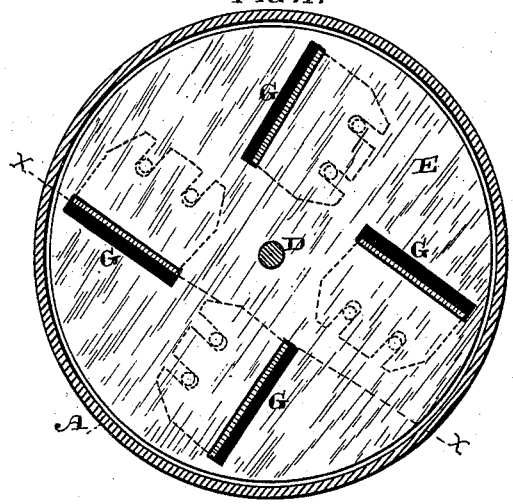
Figure 2:
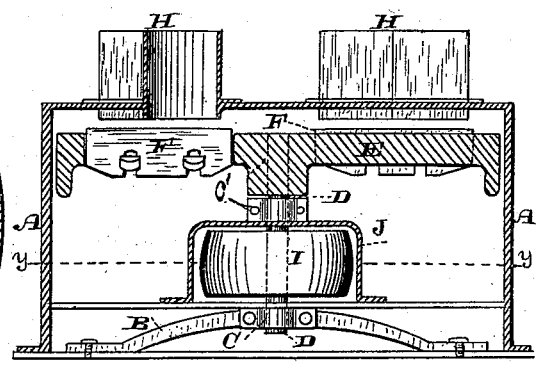
Figure 3:
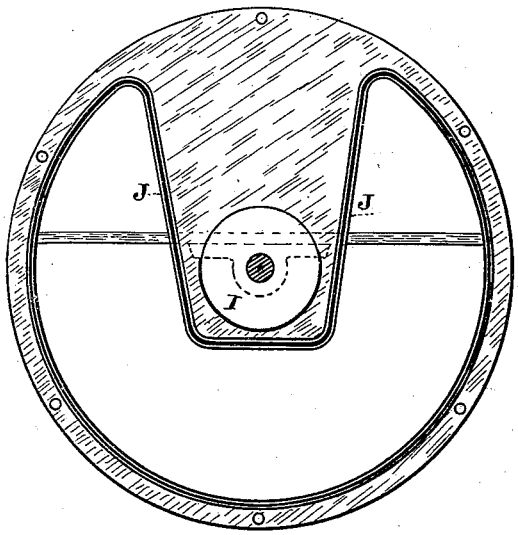
Figure 4:
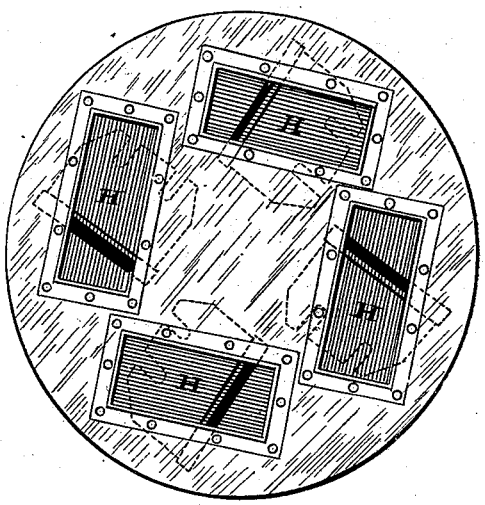
Figure 5:
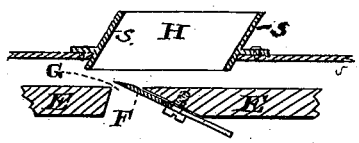

Referring to the accompanying drawings for a more complete explanation of my invention, Figure 1 is a plan view of the rotating disk and knives, the casing in section. Fig. 2 is a vertical section taken through the line X X, Fig. 1. Fig. 3 is a horizontal section taken through Y Y, Fig. 2. Fig. 4 is a plan or top view showing the feed-openings, the hoppers, and relative position of the knives in dotted lines beneath. Fig. 5 is a view of a hopper or feed-opening.

In the Patent No. 264,152, issued to me September 12, 1882, I showed and described a bark-cutting machine in which the disk carrying the cutting-knives was mounted upon a horizontal axis, so as to rotate in a vertical plane. This construction only enabled me to employ a single feed-opening, and the maximum amount of work could not be done by the cutters under such conditions.

In the present case I have shown an arrangement by which any desired number of feed-openings may be employed and the bark introduced at different points around the circumference, so that the cutters will be constantly at work, and a larger amount of bark can be prepared.

A is a cylindrical case, arranged in a vertical position, supported upon any suitable base, and having a single arm or bar, B, extending across its lower part, with the journal box or step C fixed to it centrally, so as to receive the lower end of the vertical shaft D. Another box, C', supports the upper end of said shaft. Upon the upper end of this shaft is fixed the disk E, which carries the knives or cutters F, these knives being secured to it by bolts passing through slots in their rear ends, as shown in my former patent. The edges of these knives project upward at an angle through slots G, which are made in the disk E, to allow the edges of the knives to be projected up through them as far as may be desired. These slots are not made radially from the vertical shaft D, to which the disk is fixed, but are tangent to a circle, which may be about one-third or less of the diameter of the disk. The upper surface of the disk E and the edges of the knives F run very close to the top of the case A, and through this top are made as many openings H as may be desired, provided with parallel sides or casings S S, projecting upward, as shown in Fig. 5, so as to form hoppers or receptacles into which the bark may be placed. These hoppers or openings are preferably made narrow, so as to receive the bark and hold it with its edge presented to the cutters instead of the sides. As the knives are set through the disk E upon tangential lines, as before described, it will be seen that they pass the hoppers or openings H at an angle, so that when the bark is put into these hoppers it rests upon the surface of the disk E, and the knives pass by it with a shearing action, which facilitates the cutting, and also leaves the bark in much better condition to be acted upon in the vat. The shaft D is driven by a pulley, I, which is keyed to it near the lower step, and it is covered in and protected by a casing, J, which extends inward from one side of the exterior case, A, so as to make a passage-way through which the driving-belt may pass, and this being entirely covered over it protects the belt, the pulley, and the lower step from the bark and dust which might otherwise fall upon them. All the remainder of the lower part of the casing A being open, it will be manifest that the cut bark will fall through freely and rapidly. By constructing my machine in this manner with a vertical driving-shaft and horizontal cutting-disk, it will be seen that as many feed-hoppers H may be arranged around the top of the casing A as are desired, and that bark can be placed in each of them as fast as it becomes exhausted, there being no necessity to watch it, as it will fall by gravitation and rest upon the top of the disk E, so as to be acted upon by the knives or cutters F. The hoppers or openings H are preferably formed at an angle, as shown in Fig. 5. The cutters F will, when they strike the lower end of the bark, hold it against the inclined sides of the hoppers or openings, and thus prevent any tendency of the bark to rise out of its place.

Having thus described my invention, what I claim as new, and desire to secure by Letters Patent, is—

1. A bark cutting and reducing machine comprising a knife-carrying disk having a hub and rotating in a horizontal plane, and having slots and cutters arranged tangentially to a circle of less diameter than the disk, a box or bearing, C', a driving-shaft, an exterior case provided with feed-openings, rectangular hoppers having parallel inclined walls, a driving-pulley, a bearing for the lower end of the shaft, and a casing, J, for the pulley, substantially as described.

2. The inclosing-case, the disk carrying knives and rotating in a horizontal plane, the vertical shaft, and driving-pulley I, in combination with a casing or covering, J, substantially as herein described.

In witness whereof I have hereunto set my hand.

JOHN C. HAGERTY.

Witnesses:
O. J. KRON,
S. H. NOURSE.